(12) United States Patent
Gabin et al.

(10) Patent No.: US 8,661,155 B2
(45) Date of Patent: Feb. 25, 2014

(54) SERVICE LAYER ASSISTED CHANGE OF MULTIMEDIA STREAM ACCESS DELIVERY

(75) Inventors: Frederic Gabin, Bagnolet (FR); Göran Roth, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 12/346,314

(22) Filed: Dec. 30, 2008

(65) Prior Publication Data

US 2010/0169504 A1 Jul. 1, 2010

(51) Int. Cl.
*G06F 15/16* (2006.01)
*H04N 7/16* (2011.01)

(52) U.S. Cl.
USPC ............................................. 709/235; 725/62

(58) Field of Classification Search
USPC ................... 709/230–235; 725/22, 32, 36, 62
See application file for complete search history.

(56) References Cited

U.S. PATENT DOCUMENTS

| | | | |
|---|---|---|---|
| 6,463,265 B1 | 10/2002 | Cohen et al. | |
| 6,973,081 B1 | 12/2005 | Patel | |
| 7,082,142 B1 * | 7/2006 | Begeja | 370/507 |
| 7,133,922 B1 * | 11/2006 | She et al. | 709/231 |
| 7,222,185 B1 * | 5/2007 | Day | 709/232 |
| 7,472,197 B2 * | 12/2008 | Li et al. | 709/231 |
| 7,562,375 B2 * | 7/2009 | Barrett et al. | 725/38 |
| 7,593,326 B2 * | 9/2009 | Collet et al. | 370/229 |
| 7,656,908 B1 * | 2/2010 | Begeja | 370/507 |
| 7,668,914 B2 * | 2/2010 | Parker et al. | 709/205 |
| 7,769,035 B1 * | 8/2010 | Breau et al. | 370/412 |
| 7,788,393 B2 * | 8/2010 | Pickens et al. | 709/231 |
| 2002/0107940 A1 * | 8/2002 | Brassil | 709/219 |
| 2003/0018975 A1 | 1/2003 | Stone | |
| 2003/0135594 A1 * | 7/2003 | Xu et al. | 709/223 |

(Continued)

FOREIGN PATENT DOCUMENTS

| | | | |
|---|---|---|---|
| WO | WO 2004045126 A1 * | 5/2005 | |
| WO | WO 2007068290 A1 * | 6/2007 | |
| WO | WO 2008046348 A1 * | 4/2008 | |
| WO | 2009/148370 A1 | 12/2009 | |

OTHER PUBLICATIONS

Kondrad, L. et al. "Seamless Handover for Mobile TV over DVB-H Applications." Proceedings of the 7th International Conference on Mobile and Ubiquitous Multimedia (MUM' 08), Dec. 5, 2008.

(Continued)

*Primary Examiner* — Patrice Winder
*Assistant Examiner* — Julian Chang
(74) *Attorney, Agent, or Firm* — Coats & Bennett, PLLC

(57) ABSTRACT

A streaming server sends a multimedia stream for delivery by a hybrid unicast-broadcast delivery network to a mobile terminal. To assist that mobile terminal change access delivery from unicast to broadcast, the streaming server sends multimedia content timing information that indicates one or more interstices in the content of the multimedia stream. The mobile terminal receives such multimedia content timing information upon receiving the multimedia stream by unicast. Although the mobile terminal determines the same multimedia stream is also available by broadcast, the mobile terminal initiates a change from unicast to broadcast during an interstice. Because the mobile terminal delays the access change until an interstice, any data loss resulting from the access change has a minimal effect on a subscriber's experience of the multimedia content. Moreover, regular occurrence of interstices ensures that such change will not be significantly delayed, and thus, neither will use of broadcast.

24 Claims, 10 Drawing Sheets

(56) References Cited

U.S. PATENT DOCUMENTS

| | | |
|---|---|---|
| 2004/0194143 A1* | 9/2004 | Hirose .............................. 725/97 |
| 2005/0081244 A1* | 4/2005 | Barrett et al. .................. 725/97 |
| 2005/0278751 A1* | 12/2005 | Wada et al. ...................... 725/62 |
| 2006/0047845 A1* | 3/2006 | Whited et al. ................. 709/231 |
| 2006/0059510 A1* | 3/2006 | Huang et al. .................... 725/32 |
| 2006/0143669 A1* | 6/2006 | Cohen .............................. 725/90 |
| 2006/0161635 A1* | 7/2006 | Lamkin et al. ................ 709/217 |
| 2006/0200574 A1* | 9/2006 | Pickens et al. ................. 709/231 |
| 2006/0200575 A1* | 9/2006 | Sherer et al. .................. 709/231 |
| 2006/0200576 A1* | 9/2006 | Pickens et al. ................ 709/231 |
| 2007/0005795 A1* | 1/2007 | Gonzalez ...................... 709/232 |
| 2007/0058629 A1* | 3/2007 | Luft ............................... 370/390 |
| 2007/0101012 A1* | 5/2007 | Li et al. ......................... 709/231 |
| 2007/0107026 A1* | 5/2007 | Sherer et al. ..................... 725/97 |
| 2007/0192812 A1* | 8/2007 | Pickens et al. .................. 725/94 |
| 2008/0022320 A1* | 1/2008 | Ver Steeg ........................ 725/78 |
| 2008/0101317 A1* | 5/2008 | Bouazizi ....................... 370/342 |
| 2008/0109853 A1* | 5/2008 | Einarsson et al. .............. 725/62 |
| 2008/0207137 A1* | 8/2008 | Maharajh et al. ............... 455/74 |
| 2009/0055540 A1* | 2/2009 | Foti et al. ...................... 709/228 |
| 2009/0064242 A1* | 3/2009 | Cohen et al. .................... 725/90 |
| 2009/0077247 A1* | 3/2009 | Bouazizi et al. ............... 709/229 |
| 2009/0094639 A1* | 4/2009 | Haberman et al. .............. 725/34 |
| 2009/0106803 A1* | 4/2009 | Chen et al. .................... 725/103 |
| 2009/0110132 A1* | 4/2009 | Kondrad et al. .............. 375/354 |
| 2009/0165062 A1* | 6/2009 | Harris et al. ..................... 725/87 |
| 2009/0187939 A1* | 7/2009 | Lajoie ............................. 725/34 |
| 2009/0196213 A1* | 8/2009 | Zhong et al. ................... 370/312 |
| 2009/0217316 A1* | 8/2009 | Gupta ............................. 725/32 |
| 2009/0248886 A1* | 10/2009 | Tan et al. ....................... 709/231 |
| 2009/0265746 A1* | 10/2009 | Halen et al. .................... 725/109 |
| 2009/0316615 A1* | 12/2009 | Vedantham et al. .......... 370/312 |
| 2010/0036962 A1* | 2/2010 | Gahm et al. .................. 709/231 |
| 2010/0036963 A1* | 2/2010 | Gahm et al. .................. 709/231 |
| 2010/0058405 A1* | 3/2010 | Ramakrishnan et al. ....... 725/97 |
| 2010/0106851 A1* | 4/2010 | Aoki et al. ..................... 709/231 |
| 2010/0110912 A1* | 5/2010 | Wang et al. ................... 370/252 |
| 2010/0131995 A1* | 5/2010 | Guo et al. ........................ 725/94 |
| 2010/0138876 A1* | 6/2010 | Sullivan et al. ................. 725/62 |
| 2010/0202405 A1* | 8/2010 | Li et al. ......................... 370/331 |
| 2010/0215021 A1* | 8/2010 | Li et al. ......................... 370/331 |
| 2011/0067081 A1* | 3/2011 | Strom et al. .................. 725/110 |

OTHER PUBLICATIONS

Ollikainen, V. et al. "A Handover Approach to DVB-H Services." 2006 IEEE International Conference on Multimedia and Expo, Jul. 1, 2006, pp. 629-632.

3rd Generation Partnership Project. 3GPP TS 26.237, V8.0.0 (Dec. 2008). 3rd Generation Partnership Project; Technical Specification Group Services and System Aspects/ IMS based PSS and MBMS User Service; Protocols (Release 8). Dec. 2008.

Hartung, F. et al. "Delivery of Broadcast Services in 3G Networks." IEEE Transactions on Broadcasting, vol. 53, No. 1, Mar. 2007, pp. 188-199.

* cited by examiner

SERVICE LAYER ASSISTED CHANGE OF MULTIMEDIA STREAM ACCESS DELIVERY

TECHNICAL FIELD

The present invention generally relates to methods and apparatus for changing the access delivery of a multimedia stream in a hybrid unicast-broadcast delivery network, and particularly relates to changing from unicast delivery to broadcast delivery during an interstice in the content of the multimedia stream.

BACKGROUND

Increasing demand for the delivery of multimedia content over mobile networks (e.g. mobile television) has intensified the appeal of delivering that content using broadcast technologies. Broadcast technologies entail the use of broadcast bearer services, such as Digital Video Broadcasting-Handheld (DVB-H) and Multimedia Broadcast Multicast Service (MBMS), that ensure more efficient network utilization. Unlike unicast bearer services (e.g. Packet-Switched Streaming over 3G), which consume a link for each subscriber even if the subscribers are demanding the same multimedia content in the same area, broadcast bearer services permit subscribers to share a single link for that same multimedia content. As the number of subscribers demanding that content decreases, however, so does the efficiency of broadcast delivery. Accordingly, network operators may decline to make broadcast delivery of certain multimedia content available everywhere and anytime.

In a hybrid unicast-broadcast delivery network, unicast delivery complements broadcast delivery where and when broadcast coverage for a certain multimedia stream is not available. That is, a mobile terminal detects when broadcast delivery of a certain multimedia stream becomes unavailable and changes to using unicast delivery for that stream. While such change permits delivery despite the lack of broadcast coverage, the mobile terminal should return to using the more efficient broadcast delivery if it becomes available again.

The time at which the mobile terminal changes back to using broadcast delivery, however, may affect both the efficiency of network utilization and the multimedia experience of the subscriber. If the mobile terminal changes back to using broadcast delivery before broadcast coverage is stable, for example, a ping-pong effect between unicast and broadcast delivery may result in significant data loss and interruption in the subscriber's multimedia experience. On the other hand, if the mobile terminal avoids this interruption by delaying the change for a potentially significant amount of time (e.g. until the subscriber changes the multimedia channel), network utilization becomes significantly more inefficient.

SUMMARY

Methods and apparatus taught herein advantageously permit a mobile terminal to change access delivery of a multimedia stream from unicast delivery to broadcast delivery while both efficiently utilizing network resources and minimizing interruption in the user's multimedia experience. Instead of initiating such a change immediately upon broadcast delivery becoming available, the mobile terminal initiates the change according to multimedia content timing information that indicates one or more interstices in the content of the multimedia stream. Any data loss resulting from the change during such an interstice has a minimal effect on the subscriber's multimedia experience. Moreover, the regular occurrence of interstices ensures that such change will not be significantly delayed, and thus, neither will the increase in network utilization efficiency realized by use of broadcast delivery.

More particularly, the mobile terminal receives the multimedia stream by unicast delivery over a unicast bearer as well as multimedia content timing information that indicates one or more interstices in the content of that multimedia stream. If the content of the multimedia stream comprises one or more multimedia programs and one or more commercial advertisements, for example, interstices in such content may include breaks between each multimedia program (e.g., commercial advertisements) or breaks between a multimedia program and a commercial advertisement. Alternatively, the content of the multimedia stream may comprise a motion picture film or movie and interstices in such content may include one or more scene cuts therein. Accordingly, although the mobile terminal thereafter determines that the same multimedia stream becomes available by broadcast delivery over a broadcast bearer, the mobile terminal selectively initiates a change from unicast to broadcast delivery during an interstice indicated in the multimedia content timing information.

To assist such a change, a streaming server which sends the multimedia stream to the mobile terminal determines this multimedia content timing information. The streaming server may, for example, analyze the content of the multimedia stream itself, such as by autonomously identifying the times at which commercial advertisements or other video material have been added to a multimedia program. Alternatively, the streaming server may receive indications of interstices in the multimedia content from a corresponding content provider. In any event, the streaming server sends this multimedia content timing information to the mobile terminal. The streaming server may, for example, send such information responsive to the mobile terminal's request or via appending such information to a message known by the mobile terminal as having it appended thereto.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
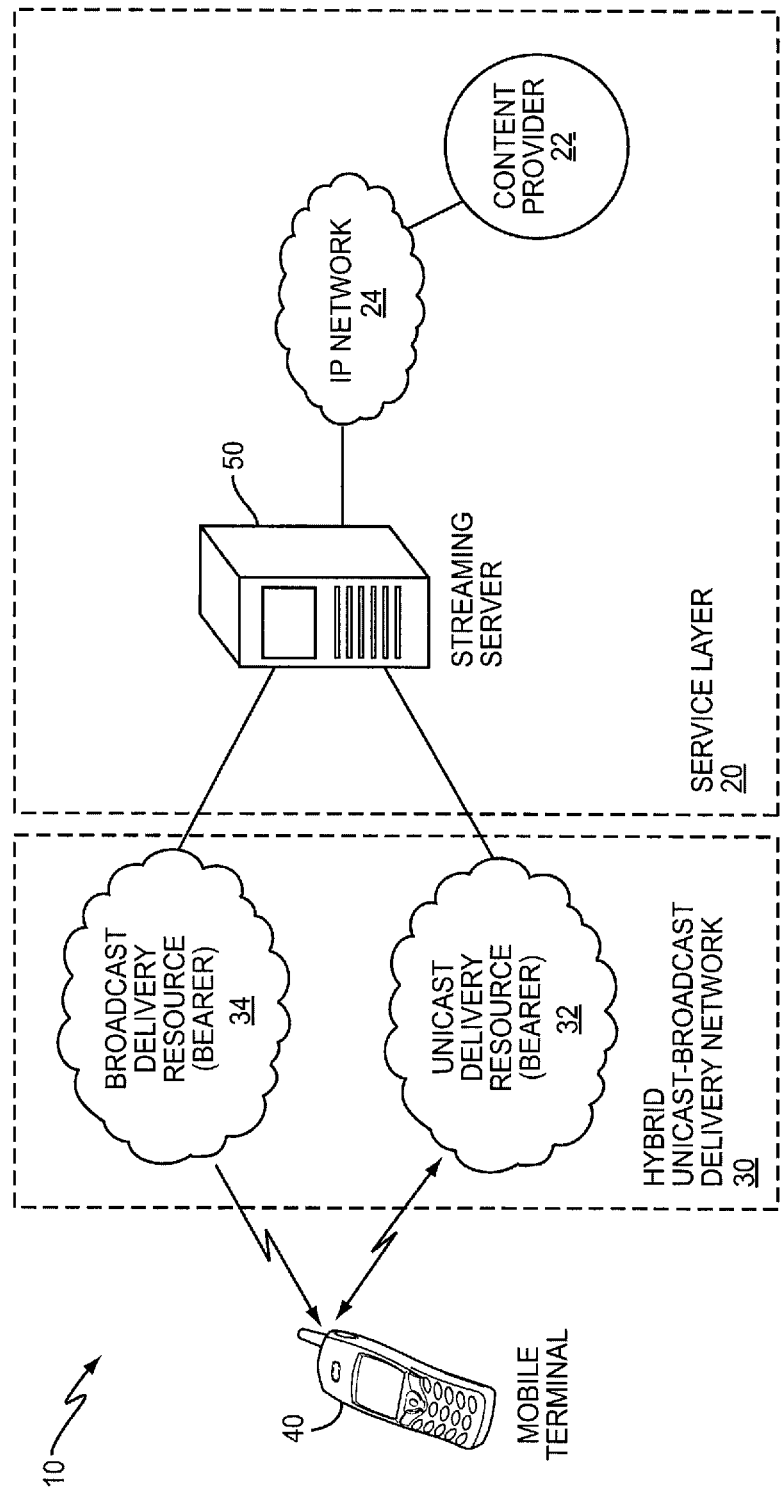
FIG. 1 is a block diagram of a multimedia system in which the present invention may be used.

FIG. 1 illustrates a multimedia system 10 in which the present invention may be employed. The multimedia system 10 comprises a service layer 20 and a hybrid unicast-broadcast delivery network 30 for delivering a multimedia stream to a mobile terminal 40.

In order to make a multimedia stream available for such delivery, the service layer 20 comprises one or more content providers 22, an IP network 24, and a streaming server 50. The one or more content providers 22 each prepare multimedia content, such as audio/video programs and commercial advertisements or motion picture films or movies for mobile television. After encoding the multimedia content in an appropriate format for streaming to the mobile terminal 40, each content provider 22 sends this content via the IP network 24 to the streaming server 50.

The streaming server 50 establishes a number of multimedia streams for the content sent from the one or more content providers 22. Each multimedia stream has content distinct from the other multimedia streams, requiring a mobile terminal 40 to know which multimedia stream to receive in order to receive certain multimedia content. Thus, the service layer 20 aggregates information regarding the content sent from each content provider 22 into an Electronic Service Guide (ESG), which describes to the mobile terminal 40 how to receive certain multimedia content via a certain multimedia stream delivered over the hybrid unicast-broadcast delivery network 30.

The hybrid unicast-broadcast delivery network 30 includes a broadcast delivery resource 34 (e.g., a broadcast bearer service) used for broadcast delivery of multimedia streams provided by the streaming server 50. Examples of broadcast bearer services include, for instance, Digital Video Broadcasting-Handheld (DVB-H) and Multimedia Broadcast Multicast Service (MBMS). Regardless of the specific broadcast bearer service, the hybrid unicast-broadcast delivery network 30 may provide a specific multimedia stream via broadcast delivery depending on the popularity of the content of that multimedia stream. If so, in order to receive that multimedia stream via broadcast delivery, the mobile terminal 40 tunes to the broadcast bearer service according to the description of the ESG. When DVB-H is utilized, for example, the mobile terminal 40 performs a local join on certain IP ports listed in the ESG as being the IP ports that the streaming server 50 pushed the multimedia stream to.

Broadcast delivery of the multimedia stream, however, may become unavailable due to lack of broadcast coverage in a certain area at a certain time (e.g. if DVB-H is utilized, the signal strength may not be sufficient for a certain quality of service). Accordingly, the ESG also describes to the mobile terminal 40 how to receive that multimedia stream via unicast delivery in the event broadcast delivery becomes unavailable. For unicast delivery, the hybrid unicast-broadcast delivery network 30 includes a unicast delivery resource 32 (e.g., a unicast bearer service). Examples of unicast bearer services include, for instance, Packet-Switched Streaming over 3G or Global System for Mobile communications (GSM). In order to initiate a change to receiving the multimedia stream via unicast delivery, the mobile terminal 40 stops receiving the multimedia stream via broadcast delivery and utilizes an application-level protocol to initiate the unicast flow of the multimedia stream, as identified by a URI in the ESG, from the streaming server 50. The Real-Time Streaming Protocol (RTSP), for example, may be used to control the streaming server 50 in this way.

However, as unicast delivery of the multimedia stream utilizes network resources in a less efficient manner than broadcast delivery thereof, the mobile terminal 40 selectively initiates a change back to using broadcast delivery if it becomes available again. The specific time that the mobile terminal 40 initiates this access change, though, depends not only on the availability of broadcast delivery, but also on the effect such change might have on a subscriber's viewing of the multimedia stream's content.

Figure 2:
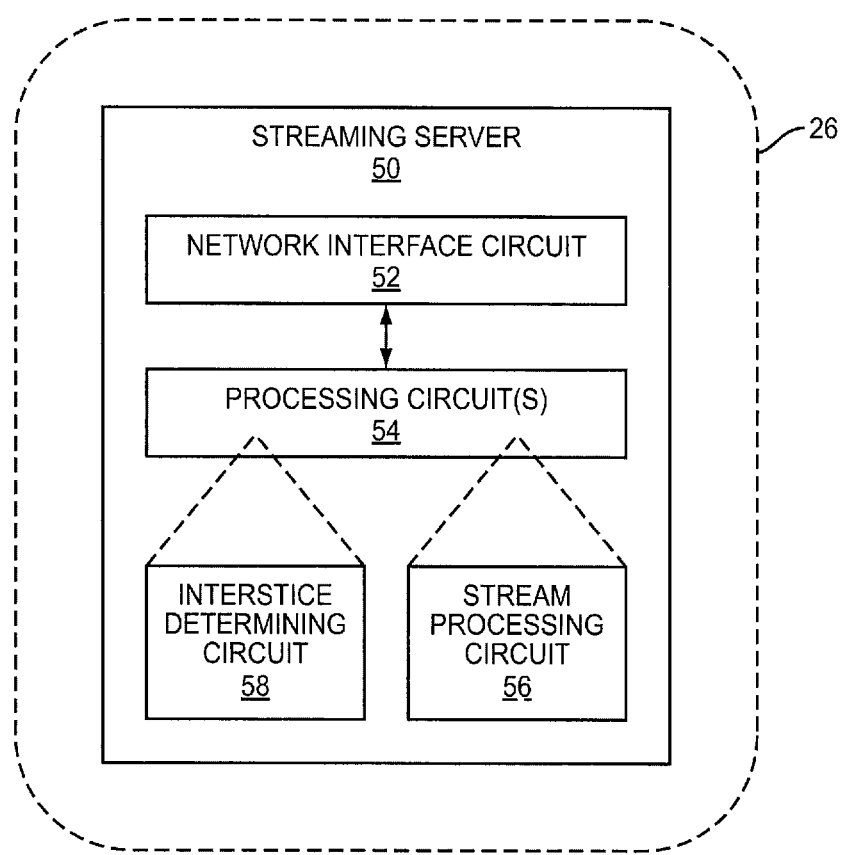
FIG. 2 is a block diagram illustrating one embodiment of a streaming server of the present invention.

To assist the mobile terminal 40 change from unicast to broadcast delivery at a time causing minimal interruption to a subscriber's viewing experience, the streaming server 50 is configured according to FIG. 2. In FIG. 2, the streaming server 50 comprises a network interface circuit 52 and one or more processing circuits 54, including a stream processing circuit 56 and an interstice determining circuit 58. The stream processing circuit 56 is configured to establish and manage the multimedia stream for sending of that stream by the network interface circuit 52 to one or more mobile terminals, including the mobile terminal 40. For example, the stream processing circuit 56 may manage the multimedia stream according to the above described protocols, such as RTSP, for initiating the unicast delivery of the multimedia stream.

The streaming server 50 assists the mobile terminal 40 change from unicast delivery, however, according to multimedia content timing information determined by the interstice determining circuit 58 and sent to the mobile terminal 40 by the network interface circuit 52. Such multimedia content timing information indicates one or more interstices in the content of the multimedia stream. In providing such multimedia content timing information to the mobile terminal 40, the streaming server 50 enables the mobile terminal 40 to selectively initiate a change from unicast to broadcast delivery during an interstice in the multimedia content and thereby minimize any interruption in the multimedia content caused by the change. Moreover, the regular occurrence of interstices ensures that such change will not be significantly delayed, and thus, neither will the increase in network utilization efficiency realized from use of broadcast delivery.

In one embodiment, for example, the content of the multimedia stream comprises one or more multimedia programs and one or more commercial advertisements. In this case, interstices in such content may include points in time when there exists a break between a multimedia program and a commercial advertisement. Alternatively, interstices may include intervals in time when there exists a break between multimedia programs, such as during a commercial advertisement. It should be noted, however, that a commercial advertisement of a multimedia stream delivered over unicast may be personalized for the mobile terminal 40, and therefore, different from a commercial advertisement of the multimedia stream delivered over broadcast during the same time. The interstice determining circuit 58 may be configured, therefore, to indicate in the multimedia content timing information only interstices during which the content of the multimedia stream is the same over both unicast and broadcast (i.e. only interstices during which an access delivery change would be appropriate). The interstice determining circuit 58 may be configured, in the alternative, to indicate all interstices in the content of the multimedia stream, but to also indicate that an access delivery change is forbidden during certain interstices (e.g., those interstices during which the content is not the same over both unicast and broadcast). The present invention, however, is not limited by the specific content of the multimedia stream.

Other embodiments, for example, contemplate that the content of the multimedia stream comprises a motion picture film or movie, including scene cuts therein. In this instance, interstices in such content include points in time when there exist scene cuts in the motion picture film or movie. Interstices in such content may also include intervals of time when there exist motion picture credits or the like. Those skilled in the art will appreciate, therefore, that the exact nature of such interstices does not limit the present invention and that interstices may also include any similar breaks in the content of the multimedia stream. Moreover, those skilled in the art will appreciate that interstices may be indicated in various formats, such as Normal Play Time (npt), absolute time (abs), or according to Network Time Protocol (NTP).

Those skilled in the art will also readily appreciate that the present invention is not limited by the manner in which the interstice determining circuit 58 determines multimedia content timing information. In one embodiment, for example, the interstice determining circuit 58 analyzes the content of the multimedia stream itself, such as by autonomously identifying the times at which commercial advertisements, scene cuts, credits, or other video materials have been added to the multimedia programs or motion picture film or movie. In an alternative embodiment, however, the interstice determining circuit 58 receives indications of interstices in the multimedia content from a corresponding content provider 22. Regardless of the manner such timing information is determined, therefore, the streaming server 50 nevertheless sends the multimedia content timing information to the mobile terminal 40.

Those skilled in the art will also readily understand that the network interface circuit 52 may be configured to send this multimedia content timing information at any point in the multimedia session. However, the mobile terminal 40 may only initiate a change in access delivery during a certain interstice if the network interface circuit 52 sends the corresponding multimedia content timing information at some point before the mobile terminal 40 experiences that interstice. To do so when the content of the multimedia stream comprises live multimedia programs, for example, the streaming server 50 may further comprise a delay buffer (not shown). By delaying the sending of the multimedia stream (e.g., for 1 second), the delay buffer enables multimedia content timing information indicating a certain interstice to be sent before the mobile terminal 40 experiences that interstice. Yet regardless of whether the content of the multimedia stream comprises live multimedia programs, the mobile terminal 40 may control if and when the network interface circuit 52 sends the multimedia content timing information.

In one embodiment, for instance, the network interface circuit 52 sends the multimedia content timing information responsive to the request of one or more mobile terminals, such as that of the mobile terminal 40. Such request may be made by the mobile terminal 40 at any point during unicast delivery to the mobile terminal 40. When requested by the mobile terminal 40 via the RTSP GET_PARAMETER method, for example, the network interface circuit 52 includes the multimedia content timing information in the body of the GET_PARAMETER response.

In an alternative embodiment, however, the network interface circuit 52 is configured to send the multimedia content timing information by appending such information to a message known by the mobile terminal to have it appended thereto. The network interface circuit 52 may, for example, send the multimedia content timing information automatically when the mobile terminal 40 changes from broadcast to unicast delivery (i.e. in anticipation of broadcast coverage becoming available). If unicast delivery is setup using RTSP in this embodiment, the network interface circuit 52 may automatically append the multimedia content timing information to the RTSP PLAY response. Alternatively, the network interface circuit 52 may append the multimedia content timing information to an RTSP SET_PARAMETER message. Other examples include appending the multimedia content timing information to the ESG or to any DVB notification message.

Of course, the streaming server 50 of the present invention is not limited to the use of any certain protocol for sending the multimedia content timing information to the mobile terminal 40. Indeed, the streaming server 50 may send the multimedia content timing information, for example, utilizing an RTSP message, a Real-time Transport Protocol packet, or a File Delivery over Unidirectional Transport (FLUTE) packet.

Figure 3:
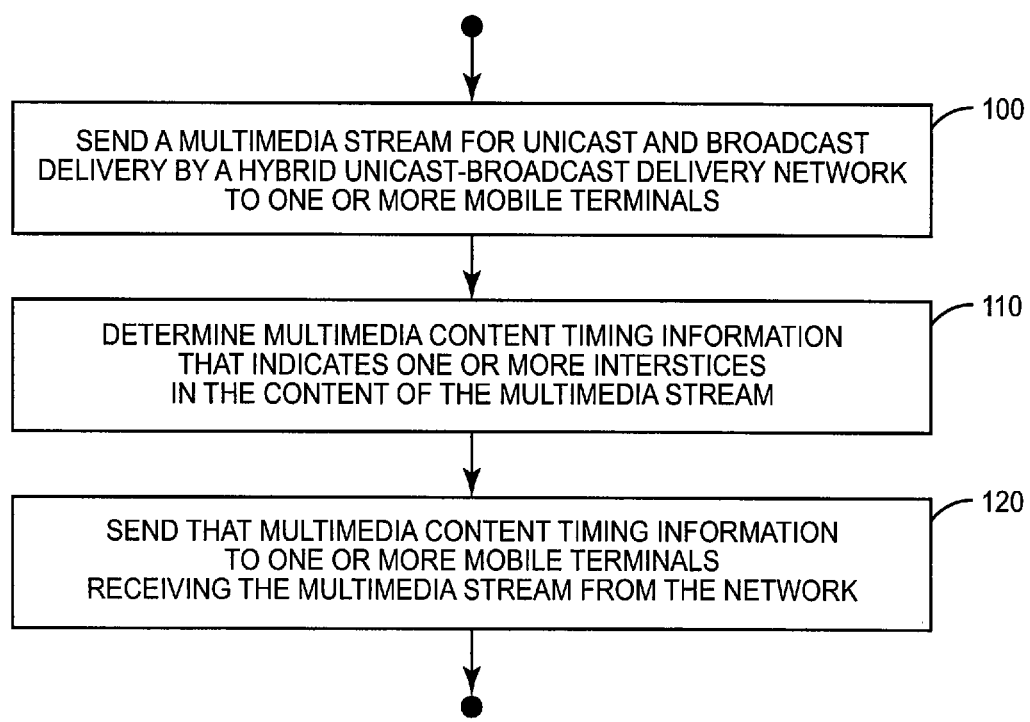
FIG. 3 is a logic flow diagram of a method in a streaming server for assisting a mobile terminal change access delivery from unicast delivery to broadcast delivery.

With the above points of variation and implementation of the streaming server 50 in mind, those skilled in the art will appreciate that the streaming server 50 of the present invention generally performs the method illustrated in FIG. 3. According to FIG. 3, the network interface circuit 52 sends a multimedia stream for unicast and broadcast delivery by a hybrid unicast-broadcast delivery network 30 to one or more mobile terminals, including the mobile terminal 40 (Block 100). To assist those mobile terminals in changing access delivery of that multimedia stream from unicast delivery to broadcast delivery, the interstice determining circuit 58 determines multimedia content timing information that indicates one or more interstices in the content of the multimedia stream (Block 110). The network interface circuit 52 thereafter sends such multimedia content timing information to one or more mobile terminals, including the mobile terminal 40, receiving the multimedia stream from the network 30 (Block 120).

Figure 4:
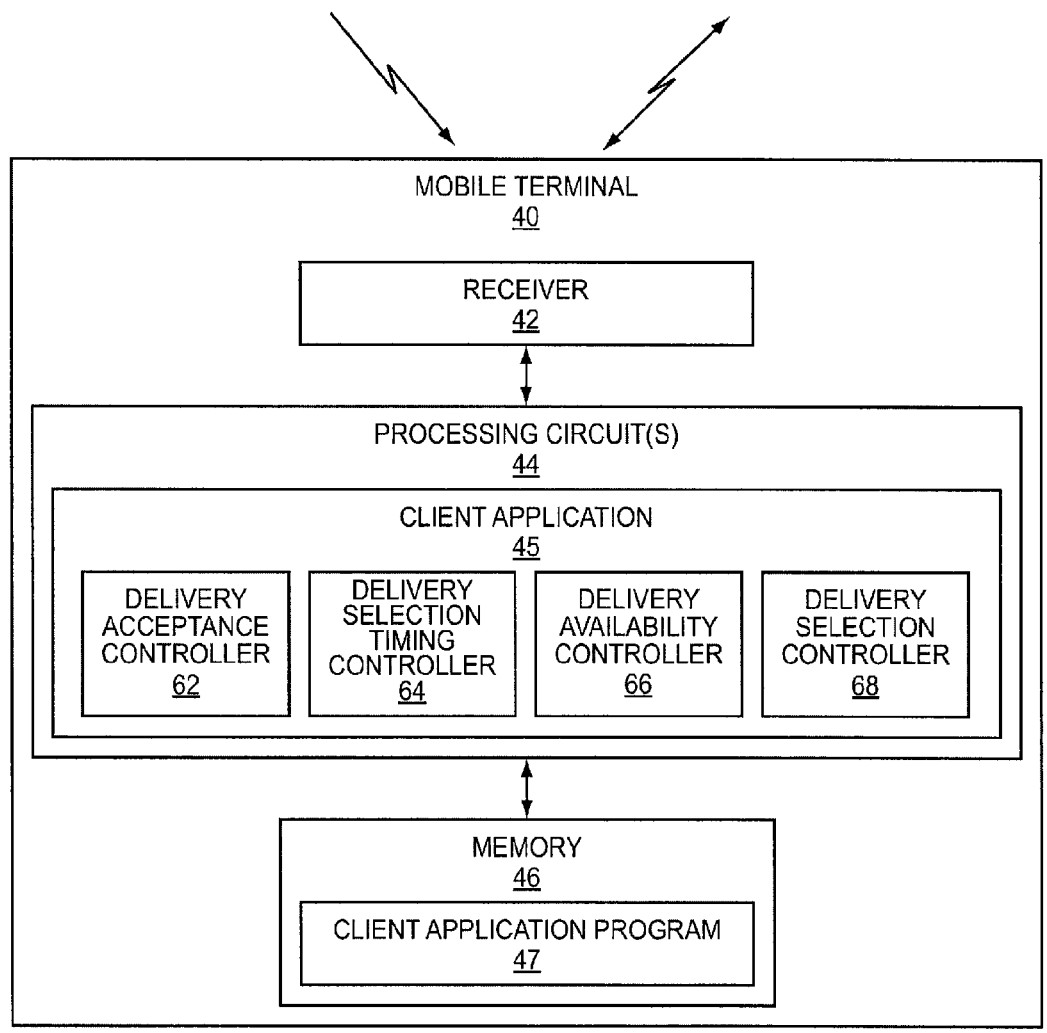
FIG. 4 is a block diagram illustrating one embodiment of a mobile terminal of the present invention.

To utilize the multimedia content timing information sent by the streaming server 50 for changing from unicast to broadcast delivery at a time causing minimal interruption to a subscriber's viewing experience, the mobile terminal 40 is configured according to FIG. 4. In FIG. 4, the mobile terminal 40 comprises a receiver 42 and one or more processing circuits 44.

The receiver 42 communicatively couples the mobile terminal 40 with the streaming server 50. Because communication between the streaming server 50 and mobile terminal 40 occurs via the hybrid unicast-broadcast network 30, the receiver 42 is configured to receive the multimedia stream from the streaming server 50 via either unicast delivery or broadcast delivery. As described previously, for example, the receiver 42 may be configured to enable a local join on certain IP ports listed in the ESG to thereby permit reception via broadcast delivery. Regardless of the access delivery, however, the receiver 42 is in turn communicatively coupled to one or more processing circuits 44.

The one or more processing circuits 44 are configured to change access delivery of the multimedia stream from unicast to broadcast delivery as described above. More particularly, the one or more processing circuits 44 are configured to receive from the streaming server 50 multimedia content timing information. Again, this multimedia content timing information indicates one or more interstices in the content of the multimedia stream and may comprise breaks between multimedia programs, breaks between a multimedia program and a commercial advertisement, scene cuts, credits, or similar breaks in content. The one or more processing circuits 44 are further configured to determine that the same multimedia stream is also available from the streaming server 50 by broadcast/multicast delivery. However, the one or more processing circuits 44 do not necessarily initiate a change to broadcast delivery as soon as it becomes available. Rather, the one or processing circuits 44 selectively initiate an access change based on the previously received multimedia content timing information. That is, the one or more processing circuits 44 selectively initiate a change from unicast delivery of the multimedia stream to broadcast delivery during a corresponding one of the interstices. The one or more processing circuits 44 may, for example, change to broadcast delivery during the next upcoming interstice. In changing from unicast to broadcast delivery during an interstice in the multimedia content, the mobile terminal 40 thereby minimizes any possible interruption in the multimedia content caused by the change. Moreover, the regular occurrence of these interstices ensures that such change will not be significantly delayed, and thus, neither will the increase in network utilization efficiency realized from use of broadcast delivery.

In one embodiment illustrated in FIG. 4, the mobile terminal 40 further comprises a memory 47 for storing a client application program 47. In this embodiment, the one or more processing circuits 44 are configured to change access delivery as described above via execution of the client application program, thereby creating a client application 45. The client application 45 may comprise, for example, one of many applications in the mobile terminal 40 or high level logic residing in the application domain that provides common functionality available to those many applications in the mobile terminal 40. In any case, the client application 45 may utilize the services of one or more middleware API layers, such as a multimedia player, to communicate with and effectuate the reception of the multimedia stream from the streaming server 50 in the service layer 20. Moreover, to change access delivery of the multimedia stream from unicast to broadcast delivery as described above, in one embodiment the client application 45 functionally comprises a delivery acceptance controller 62, a delivery selection timing controller 64, a delivery availability controller 66, and a delivery selection controller 68.

The delivery acceptance controller 62 is configured to receive the multimedia stream sent from the streaming server 50 by unicast delivery over a unicast bearer. Although the delivery availability controller is configured to determine that the same multimedia stream is also available from the streaming server 50 by broadcast delivery over a broadcast bearer, the mobile terminal 40 does not necessarily change to broadcast delivery as soon as it becomes available. Rather, the delivery selection timing controller 64 receives the multimedia content timing information sent by the streaming server 50 as discussed above and the delivery selection controller 68 selectively initiates an access change based on such timing information. Accordingly, the delivery selection controller 68 selectively initiates a change from unicast delivery of the multimedia stream to broadcast delivery during a corresponding one of the interstices.

Those skilled in the art will appreciate the corresponding variations in the mobile terminal 40 which may accompany the above described variations in the streaming server 50. In one embodiment, for example, the one or more processing circuits 44 are further configured to request the multimedia content timing information from the streaming server 50. In such an embodiment, the one or more processing circuits 44 may utilize the RTSP GET_PARAMETER method for requesting such timing information. In an alternative embodiment, the one or more processing circuits 44 are configured to decode a message known to have the multimedia content timing information appended thereto. The one or more processing circuits 44 may, for example, receive the timing information via decoding the streaming server's 50 response to the RTSP PLAY method or by decoding an RTSP SET_PARAMETER message sent by the streaming server 50. Other examples include appending the multimedia content timing information to the ESG or to any DVB notification message. Yet the mobile terminal 40 of the present invention is not limited to the use of any certain protocol for receiving the multimedia content timing information. Indeed, the mobile terminal 40 may receive the multimedia content timing information, for example, by decoding an RTSP message, a Real-time Transport Protocol packet, or a File Delivery over Unidirectional Transport (FLUTE) packet.

Other variations, however, may accompany a particular implementation of the mobile terminal 40. In one embodiment, the one or more processing circuits 44 only check whether the multimedia stream is also available by broadcast delivery at a time immediately before an interstice indicated by the multimedia content timing information. That is, the one or more processing circuits 44 determine that the same multimedia stream is also available by broadcast delivery just before an interstice occurs and selectively initiate a change from unicast to broadcast delivery during that interstice.

Moreover, the decision made by the one or more processing circuits 44 regarding which interstice to selectively initiate an access change during may also be made more intelligent (e.g. for preventing a ping pong effect between access delivery types). In one embodiment, for instance, the one or more processing circuits 44 selectively initiate a change from unicast delivery to broadcast delivery by initiating a change if the multimedia stream has been received by unicast delivery for a minimum period of time. In one embodiment, for example, the one or more processing circuits 44 may maintain a history of access delivery change times for the multimedia stream, including the most recently changed access delivery from broadcast to unicast delivery. In this case, the one or more processing circuits 44 may selectively initiate a change from unicast back to broadcast delivery if a minimum time has passed since this most recent access delivery change time. Regardless of the particular implementation, however, the one or more processing circuits 44 in this embodiment prevent a potential ping pong effect between access delivery types.

Figure 5:
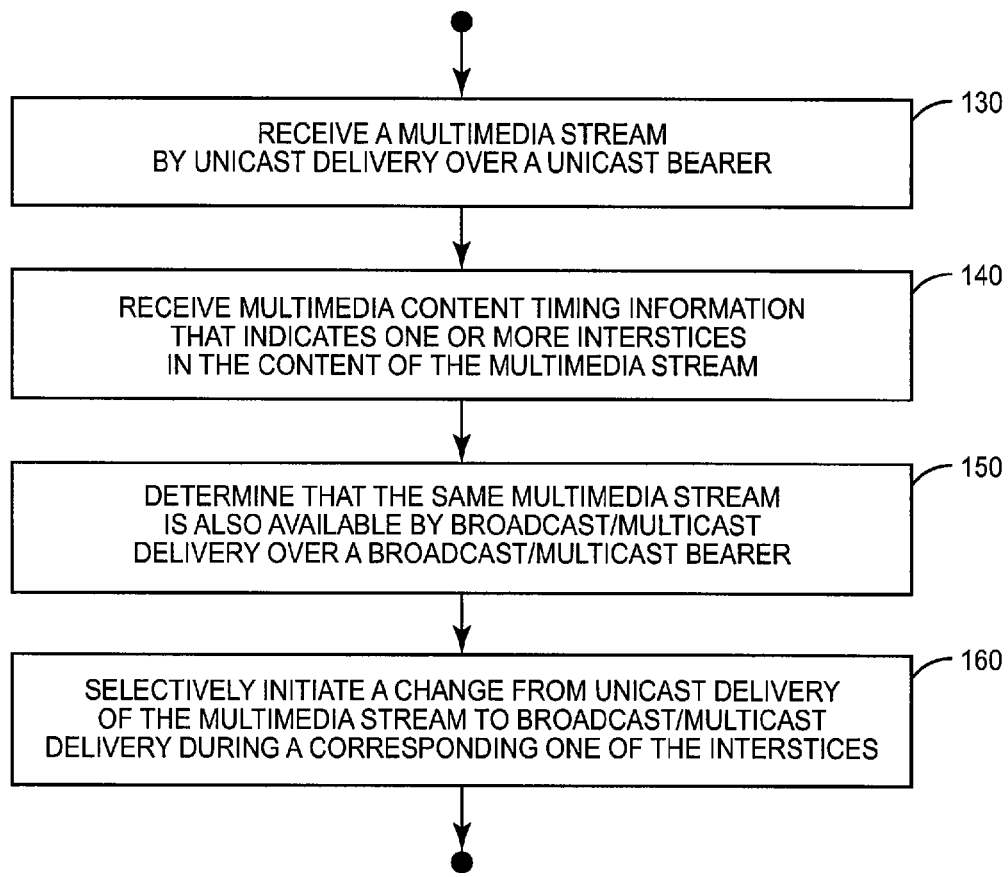
FIG. 5 is a logic flow diagram of a method in a mobile terminal for changing access delivery from unicast delivery to broadcast delivery.

Again, with the above points of variation and implementation of the mobile terminal 40 in mind, those skilled in the art will appreciate that the mobile terminal 40 of the present invention generally performs the method illustrated in FIG. 5. According to FIG. 5, the receiver 42 receives the multimedia stream by unicast delivery over a unicast bearer (Block 130). To enable the mobile terminal 40 to change from this unicast delivery to broadcast delivery at a time causing minimal interruption to a subscriber's viewing experience, the one or more processing circuits 44 receive multimedia content timing information that indicates one or more interstices in the content of the multimedia stream (Block 140). At a time after the one or more processing circuits 44 determine that the same multimedia stream is also available by broadcast delivery over a broadcast bearer (Block 150), the one or more processing circuits 44 selectively initiate a change from unicast delivery of the multimedia stream to broadcast delivery during a corresponding one of the interstices (Block 160).

Figure 6A:
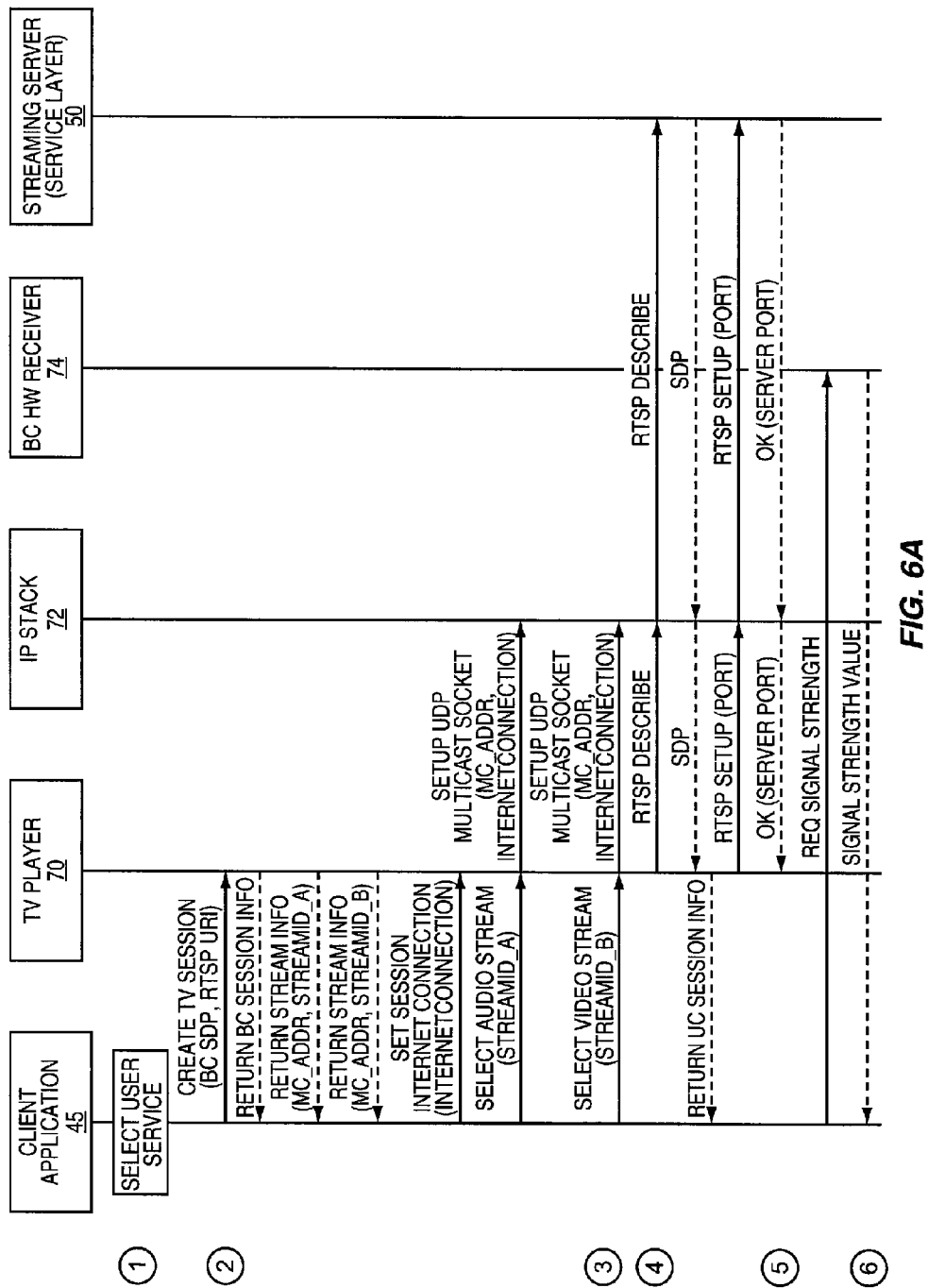
FIGS. 6A-6C are call flow diagrams illustrating the procedure by which a mobile terminal changes from unicast delivery to broadcast delivery over DVB-H through requesting multimedia content timing information from a streaming server via RTSP.
Figure 6B:
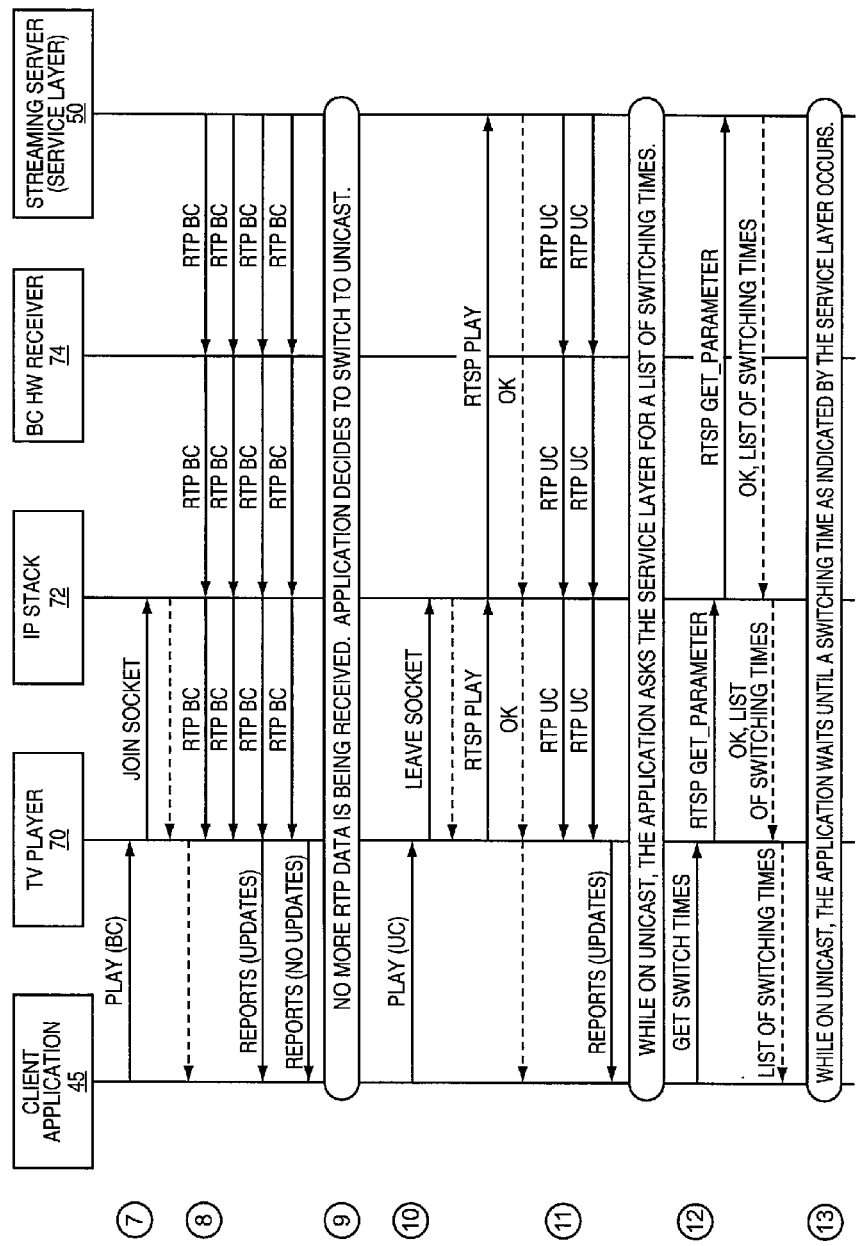
Figure 6C:
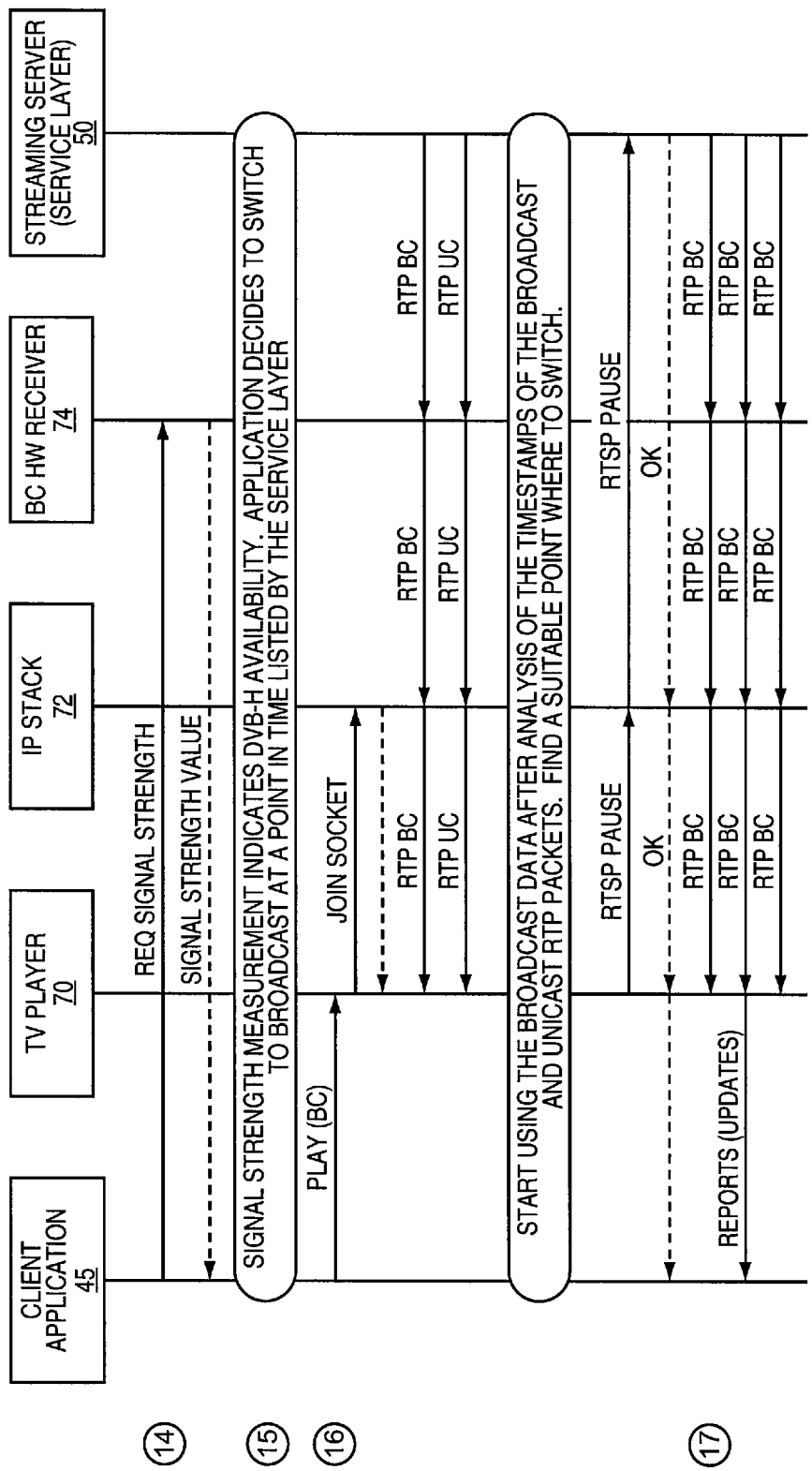

The embodiment of FIGS. 6A-6C illustrates a specific example of the mobile terminal 40 implemented according to the one or more processing circuits 44 changing access delivery via a client application 45. Specifically, the client application 45 is configured to perform the methods as described above for receiving a mobile television multimedia stream. In FIGS. 6A-6C, the client application 45 utilizes the services of the middleware API layers TV Player 70 and BC HW Receiver 74 to communicate with and effectuate reception of the multimedia stream from the streaming server 50. Accordingly, the TV Player 70 provides services to the client application 45 related to mobile television reception and rendering, as well as communication with the streaming server 50 via the IP stack 72. The IP stack 72 provides IP based transport using RTP/UDP/IP for transporting the multimedia stream and RTSP/TCP/IP for transporting control messages related to receiving the multimedia stream. In addition to providing the multimedia stream to the IP stack 72, the BC HW Receiver enables the client application 45 to receive indications of the availability of broadcast delivery via a signal strength indication API. While such typical implementation of the mobile terminal 40 remains useful for illustrating the present invention, those skilled in the art will appreciate the particular implementation used does not limit the present invention.

Referring now to the call flow diagram in FIG. 6A, the client application 45 changes from unicast delivery to broadcast delivery over DVB-H by requesting multimedia content timing information from the streaming server 50 via RTSP. Specifically, given a list of multimedia content contained in the ESG, the subscriber selects to view certain multimedia content (Step 1). The ESG also contains an RTSP URI and a BC Session Description Protocol (SDP) that describes to the client application 45 how to receive the multimedia stream corresponding to the selected multimedia content over both unicast and broadcast delivery. Based on this description, the client application 45 creates a TV session from the TV Player 70 using the RTSP URI and BC SDP for the multimedia stream (Step 2) and chooses the multimedia tracks (e.g., audio and video) to be rendered (Step 3). Given the multimedia tracks chosen by the client application 45, the TV Player 70 sets up via RTSP a session for unicast delivery (Step 4) as well as a parallel session for broadcast delivery (Step 5).

In deciding to receive the multimedia stream via either unicast or broadcast delivery, the client application 45 determines whether the preferred broadcast delivery is available. To do so, the client application 45 uses the signal strength API from the BC HW Receiver 74 to check the signal strength for DVB-H (Step 6). In this example, the signal strength meets the requirements for a certain quality of service, and thus, as shown in FIG. 6B the client application 45 requests to receive the multimedia stream via broadcast delivery (Step 7). After the TV Player 70 performs a local join on the IP ports listed in the ESG for broadcast delivery, the TV Player 70 receives the multimedia stream for rendering via broadcast delivery (Step 8).

After a time, however, the client application 45 receives reports that indicate the IP packet arrival rate is insufficient for the preferred broadcast delivery of the multimedia stream. Being out of broadcast coverage, the client application 45 decides to change from broadcast to unicast delivery (Step 9). Accordingly, the client application 45 requests to receive the multimedia stream via unicast delivery using the previously set up unicast session (Step 10). To effectuate such change, the TV Player 70 terminates broadcast delivery and initiates unicast delivery via the RTSP PLAY method (Step 11). The streaming server 50 provides a response ("OK") to the RTSP PLAY request, whereupon the TV PLAYER 70 receives the multimedia stream for rendering via unicast delivery.

As described above, however, the client application 45 prefers to receive the multimedia stream via broadcast delivery if available. Therefore, in preparation for changing to broadcast delivery if and when available, the client application 45 requests multimedia content timing information (e.g., a list of switching times) to effectuate such change during a time causing minimal interruption in a subscriber's viewing of the multimedia content (Step 12). The list of switching times comprises, as mentioned previously, interstices in the content of the multimedia stream such as breaks between multimedia programs, breaks between a multimedia program and a commercial advertisement, scene cuts, credits, or similar breaks in content. In response to the request made via the TV Player 70 using the RTSP GET_PARAMETER method, the streaming server 50 provides the requested multimedia content timing information.

Immediately before an interstice indicated by the multimedia content timing information (Step 13), the client application 45 determines whether the preferred broadcast delivery is available by checking the signal strength for DVB-H as shown in FIG. 6C (Step 14). In this example, the signal strength meets the requirements for a certain quality of service for broadcast delivery (Step 15). The client application 45, therefore, may selectively initiate a change to the preferred broadcast delivery at an interstice so as to cause minimal interruption in a subscriber's viewing of the multimedia content. To so do, the client application requests to receive the multimedia stream via broadcast delivery (Step 16), whereupon the TV Player 70 changes to using broadcast delivery at an interstice indicated in the multimedia content timing information (Step 17).

Figure 7:
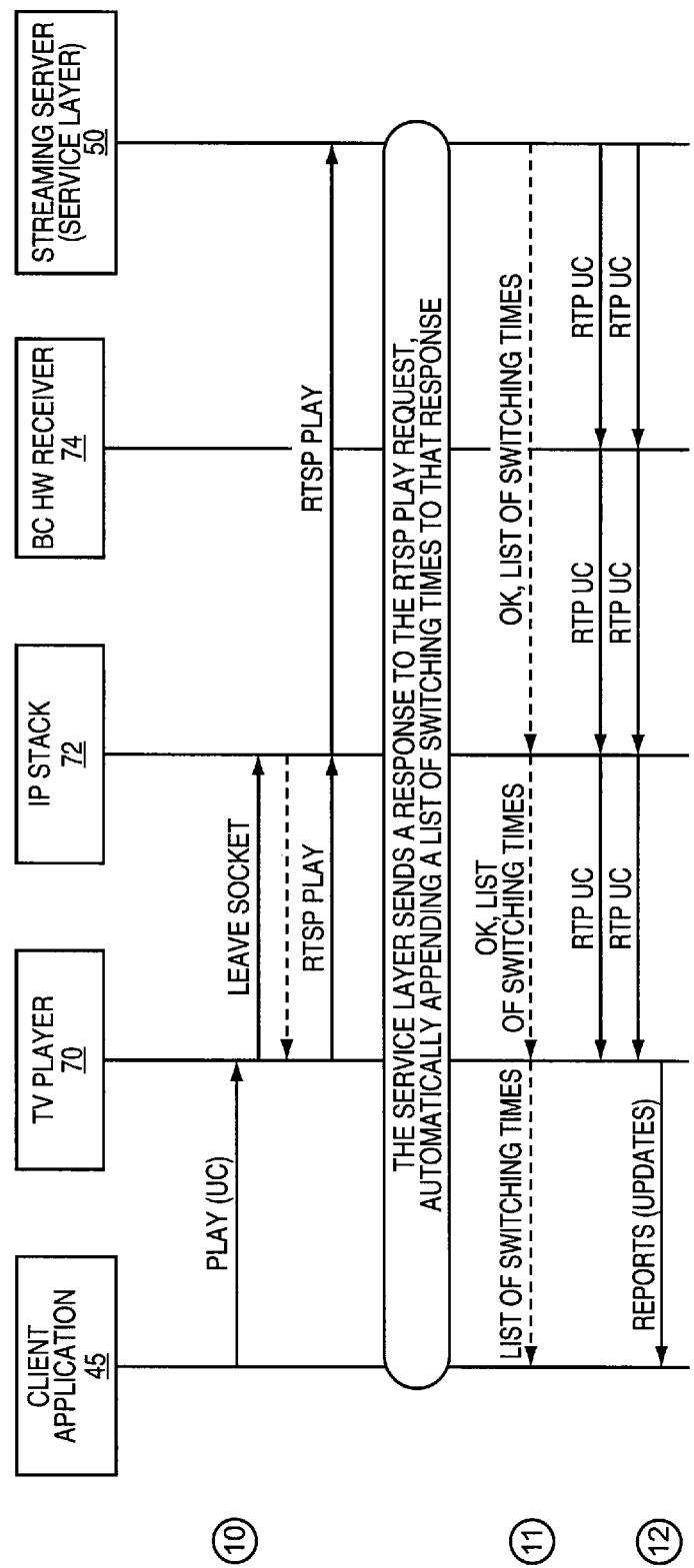
FIG. 7 is a portion of a call flow diagram illustrating the procedure by which a mobile terminal changes from unicast delivery to broadcast delivery over DVB-H through decoding a streaming server's RTSP PLAY response known to have multimedia content timing information appended thereto.

The above example may be modified, of course, to illustrate the client application 45 receiving the multimedia content timing information by decoding a message known to have such information appended thereto. The above mentioned steps 10-12 in FIG. 6B, for example, may be replaced with the steps 10-12 illustrated in FIG. 7. In FIG. 7, the streaming server 50 sends a response ("OK") to the RTSP PLAY request of the client application 45 (Step 10) and automatically appends the list of switching times to that response (Step 11). Accordingly, the client application 45 decodes this response, which is known to have the list of switching times appended thereto. Having already received the list of switching times by decoding this response, the client application 45 does not need to specifically request the list as in Step 12 illustrated in FIG. 6B. Rather, the client application 45 may simply receive the multimedia stream via unicast delivery (Step 12).

Figure 8:
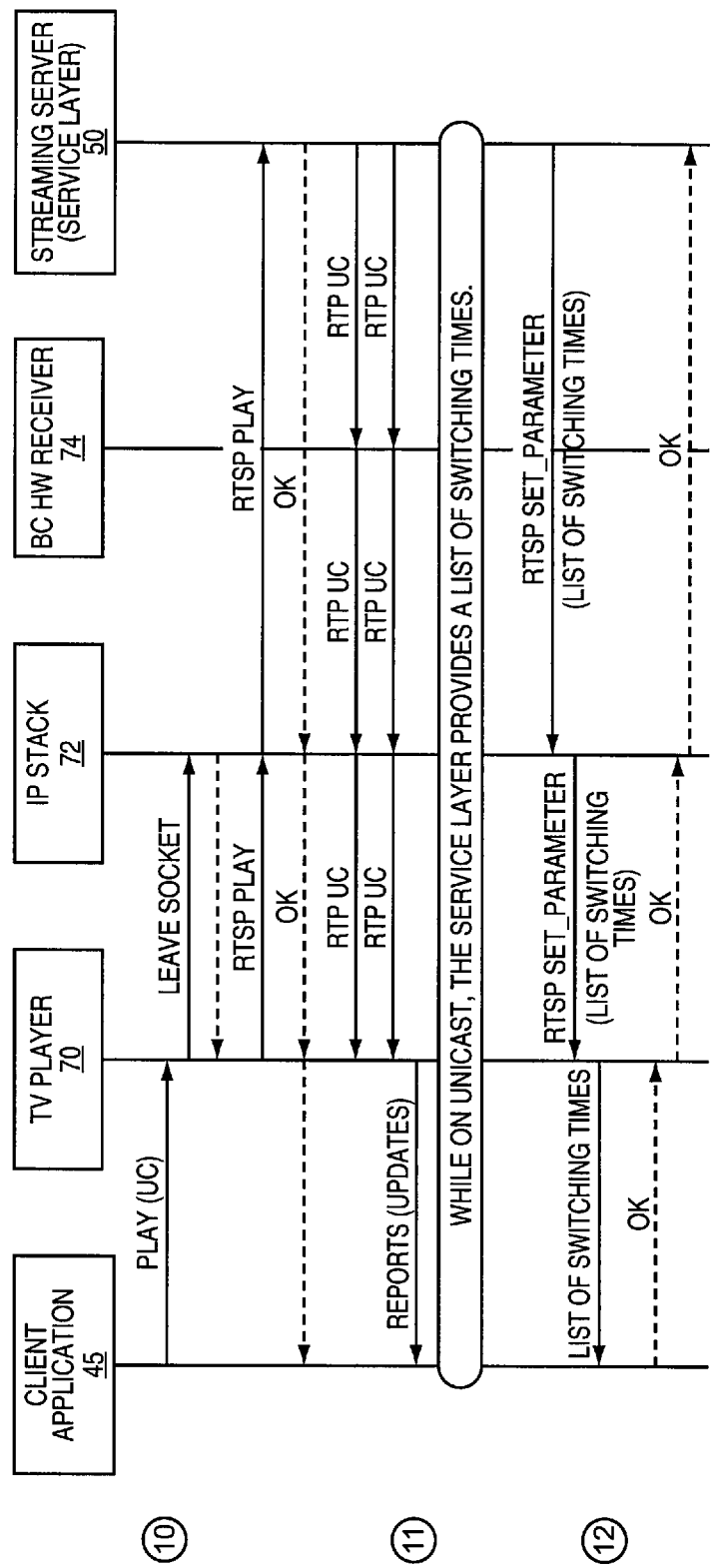
FIG. 8 is a portion of a call flow diagram illustrating the procedure by which a mobile terminal changes from unicast delivery to broadcast delivery over DVB-H through decoding a streaming server's RTSP SET_PARAMETER message known to have multimedia content timing information appended thereto.

Alternatively, the above mentioned steps 10-12 in FIG. 6B may be replaced with the steps 10-12 illustrated in FIG. 8. In FIG. 8, again the client application 45 requests to receive the multimedia stream via unicast delivery (Step 10) and the TV PLAYER 70 correspondingly initiates such via the RTSP PLAY method (Step 11). Instead of automatically appending the list of switching times to the RTSP PLAY response as in FIG. 7, however, the streaming server 50 automatically appends the list to an RTSP SET_PARAMETER message sent some time after the TV PLAYER 70 has begun to receive the multimedia stream for rendering via unicast delivery (Step 12). Accordingly, the client application 45 decodes this message, which is known to have the list of switching times appended thereto.

Regardless of the manner in which the client application 45 receives the multimedia content timing information in FIGS. 7 and 8, though, the client application 45 initiates a change of access delivery in the same manner as described with regard to FIGS. 6A-6C, namely according to interstices indicated within the multimedia content timing information.

However, it should be understood that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method in a mobile terminal of changing access delivery of a multimedia stream from unicast delivery to broadcast/multicast delivery in a hybrid unicast-broadcast delivery network, comprising:
   receiving the multimedia stream by unicast delivery over a unicast bearer;
   receiving multimedia content timing information that indicates, in advance, when one or more interstices in the content of the multimedia stream will occur, and that also indicates whether an access change during each of the one or more interstices is forbidden;
   selectively checking, at one or more times associated with said one or more interstices indicated by the multimedia content timing information, whether the same multimedia stream is also available by broadcast/multicast delivery over a broadcast/multicast bearer; and
   selectively initiating a change from unicast delivery of the multimedia stream to broadcast/multicast delivery during an interstice associated with a time at which said checking indicates availability of the multimedia stream by broadcast/multicast delivery, if the multimedia content timing information does not indicate that a change during that interstice is forbidden.

2. The method of claim 1 wherein selectively initiating a change from unicast delivery of the multimedia stream to broadcast/multicast delivery comprises initiating a change if the multimedia stream has been received by unicast delivery for a minimum period of time.

3. The method of claim 1 further comprising requesting the multimedia content timing information.

4. The method of claim 1 wherein receiving the multimedia content timing information comprises decoding a message that is received when the mobile terminal begins to receive the multimedia stream by unicast delivery and that is known to have the multimedia content timing information appended thereto.

5. The method of claim 1 wherein receiving the multimedia content timing information comprises decoding one of a Real-Time Streaming Protocol message, a Real-time Transport Protocol packet, or a File Delivery over Unidirectional Transport (FLUTE) packet.

6. The method of claim 1,
   wherein the content of the multimedia stream comprises one or more multimedia programs and one or more commercial advertisements, and the one or more interstices occur either during said commercial advertisements or during a break between a multimedia program and a commercial advertisement; or
   wherein the content of the multimedia stream comprises a motion picture film and one or more scene cuts therein, and the one or more interstices occur during said scene cuts.

7. The method of claim 1, wherein a time associated with an interstice comprises a time immediately before that interstice.

8. A mobile terminal comprising:
   a receiver for communicatively coupling the mobile terminal with a streaming server and configured to receive a multimedia stream from the streaming server by unicast delivery over a unicast bearer or by broadcast/multicast delivery over a broadcast/multicast bearer; and
   one or more processing circuits communicatively coupled to the receiver and configured to change access delivery of the multimedia stream from unicast delivery to broadcast/multicast delivery in a hybrid unicast-broadcast delivery network by:
      receiving from the streaming server multimedia content timing information that indicates, in advance, when one or more interstices in the content of the multimedia stream will occur, and that also indicates whether an access change during each of the one or more interstices is forbidden;
      selectively checking, at one or more times associated with said one or more interstices indicated by the multimedia content timing information, whether the same multimedia stream is also available from the streaming server by broadcast/multicast delivery; and
      selectively initiating a change from unicast delivery of the multimedia stream to broadcast/multicast delivery during an interstice associated with a time at which said checking indicates availability of the multimedia stream by broadcast/multicast delivery, if the multimedia content timing information does not indicate that a change during that interstice is forbidden.

9. The mobile terminal of claim 8 wherein the one or more processing circuits are configured to selectively initiate a change from unicast delivery of the multimedia stream to broadcast/multicast delivery by initiating a change if the multimedia stream has been received by unicast delivery for a minimum period of time.

10. The mobile terminal of claim 8 wherein the one or more processing circuits are further configured to request the multimedia content timing information from the streaming server.

11. The mobile terminal of claim 8 wherein the one or more processing circuits are configured to receive the multimedia content timing information by decoding a message that is received when the mobile terminal begins to receive the multimedia stream by unicast delivery and that is known to have the multimedia content timing information appended thereto.

12. The mobile terminal of claim 8 wherein the one or more processing circuits are configured to receive the multimedia content timing information by decoding one of a Real-Time Streaming Protocol message, a Real-time Transport Protocol packet, or a File Delivery Over Unidirectional Transport (FLUTE) packet.

13. The mobile terminal of claim 8,
   wherein the content of the multimedia stream comprises one or more multimedia programs and one or more commercial advertisements, and the one or more interstices occur either during said commercial advertisements or during a break between a multimedia program and a commercial advertisement; or
   wherein the content of the multimedia stream comprises a motion picture film and one or more scene cuts therein, and the one or more interstices occur during said scene cuts.

14. The mobile terminal of claim 8, wherein a time associated with an interstice comprises a time immediately before that interstice.

15. A method in a streaming server of assisting a mobile terminal change access delivery of a multimedia stream from unicast delivery to broadcast/multicast delivery in a hybrid unicast-broadcast delivery network, comprising:

sending the multimedia stream for unicast and broadcast delivery by said network to one or more mobile terminals;

determining multimedia content timing information that indicates when one or more interstices in the content of the multimedia stream will occur;

indicating as part of the multimedia content timing information whether an access change during each of the one or more interstices is forbidden; and sending said multimedia content timing information to each of one or more mobile terminals when that mobile terminal begins to receive the multimedia stream from said network by unicast delivery.

16. The method of claim 15 wherein sending said multimedia content timing information to one or more mobile terminals comprises sending the multimedia content timing information responsive to a request from the one or more mobile terminals.

17. The method of claim 15 wherein sending said multimedia content timing information to one or more mobile terminals comprises appending the multimedia content timing information to a message known by the one or more mobile terminals to have the multimedia content timing information appended thereto.

18. The method of claim 15 wherein sending said multimedia content timing information to one or more mobile terminals comprises sending one of a Real-Time Streaming Protocol message, a Real-time Transport Protocol packet, or a File Delivery Over Unidirectional Transport (FLUTE) packet.

19. The method of claim 15,
wherein the content of the multimedia stream comprises one or more multimedia programs and one or more commercial advertisements, and the one or more interstices occur either during said commercial advertisements or during a break between a multimedia program and a commercial advertisement; or
wherein the content of the multimedia stream comprises a motion picture film and one or more scene cuts therein, and the one or more interstices occur during said scene cuts.

20. A streaming server configured to assist a mobile terminal change access delivery of a multimedia stream from unicast delivery to broadcast/multicast delivery in a hybrid unicast-broadcast delivery network, comprising:

a stream processing circuit configured to establish and manage the multimedia stream;

an interstice determining circuit configured to determine multimedia content timing information that indicates when one or more interstices in the content of the multimedia stream will occur and to indicate as part of the multimedia content timing information whether an access change during each of the one or more interstices is forbidden; and a network interface circuit configured to send the multimedia stream for unicast and broadcast delivery by said network to one or more mobile terminals and to send the multimedia content timing information to each of one or more mobile terminals when that mobile terminal begins to receive the multimedia stream from said network by unicast delivery.

21. The streaming server of claim 20 wherein the network interface circuit is configured to send the multimedia content timing information to one or more mobile terminals responsive to a request from the one or more mobile terminals.

22. The streaming server of claim 20 wherein the network interface circuit is configured to send the multimedia content timing information to one or more mobile terminals by appending the multimedia content timing information to a message known by the one or more mobile terminals to have the multimedia content timing information appended thereto.

23. The streaming server of claim 20 wherein the network interface circuit is configured to send the multimedia content timing information to one or more mobile terminals by sending one of a Real-Time Streaming Protocol message, a Real-time Transport Protocol packet, or a File Delivery Over Unidirectional Transport (FLUTE) packet.

24. The streaming server of claim 20,
wherein the content of the multimedia stream comprises one or more multimedia programs and one or more commercial advertisements, and the one or more interstices occur either during said commercial advertisements or during a break between a multimedia program and a commercial advertisement; or
wherein the content of the multimedia stream comprises a motion picture film and one or more scene cuts therein, and the one or more interstices occur during said scene cuts.

* * * * *